US012284290B2

(12) United States Patent
Yavuz

(10) Patent No.: US 12,284,290 B2
(45) Date of Patent: Apr. 22, 2025

(54) PUBLICLY VERIFIABLE AND RESILIENT SYMMETRIC AUTHENTICATION AND PRIVACY SYSTEMS AND RELATED METHODS

(71) Applicant: UNIVERSITY OF SOUTH FLORIDA, Tampa, FL (US)

(72) Inventor: Attila Altay Yavuz, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 229 days.

(21) Appl. No.: 18/178,286

(22) Filed: Mar. 3, 2023

(65) Prior Publication Data
US 2023/0283481 A1 Sep. 7, 2023

Related U.S. Application Data

(60) Provisional application No. 63/316,024, filed on Mar. 3, 2022.

(51) Int. Cl.
*H04L 9/32* (2006.01)
*H04L 9/00* (2022.01)
*H04L 9/08* (2006.01)

(52) U.S. Cl.
CPC ............ *H04L 9/3247* (2013.01); *H04L 9/008* (2013.01); *H04L 9/0861* (2013.01); *H04L 9/0891* (2013.01); *H04L 9/3242* (2013.01)

(58) Field of Classification Search
CPC ..... H04L 9/3247; H04L 9/008; H04L 9/0861; H04L 9/0891; H04L 9/3242
See application file for complete search history.

(56) References Cited

U.S. PATENT DOCUMENTS

| 10,587,416 | B1 | 3/2020 | Yavuz | |
| 10,630,478 | B1* | 4/2020 | Yavuz | H04L 9/0894 |
| 11,184,157 | B1* | 11/2021 | Gueron | H04L 9/14 |
| 11,689,366 | B2* | 6/2023 | Monica | H04L 9/14 |
| | | | | 713/176 |
| 2022/0377055 | A1* | 11/2022 | Liu | H04L 9/3247 |

(Continued)

OTHER PUBLICATIONS

Agrawal, S., Mohassel, P., Mukherjee, P., & Rindal, P. (Oct. 2018). DiSE: distributed symmetric-key encryption. In Proceedings of the 2018 ACM SIGSAC Conference on Computer and Communications Security (pp. 1-56).

(Continued)

*Primary Examiner* — Frantz B Jean
(74) *Attorney, Agent, or Firm* — Quarles & Brady LLP

(57) ABSTRACT

A method for publicly verifiable symmetric cryptography is disclosed. The method includes: obtaining an initial encrypted key and a homomorphic public key; obtaining a first message and an initial signature; calculating an initial hashed value of the first message; setting a cryptographic function of the initial hashed value of the first message and an initial private key; generating an evaluated value based on the cryptographic function, the homomorphic public key, the initial encrypted key, and the initial hashed value of the first message; and transmitting, at the verifier, a verification result based on a hashed value of the initial signature and the evaluated value. Other aspects, embodiments, and features are also claimed and described.

22 Claims, 6 Drawing Sheets

(56) References Cited

U.S. PATENT DOCUMENTS

2023/0188366 A1\* 6/2023 Steinmetz ............ H04L 9/3247 713/176

OTHER PUBLICATIONS

Agrawal, S., & Boneh, D. (2009). Homomorphic MACs: MAC-based integrity for network coding. In Applied Cryptography and Network Security: 7th International Conference, ACNS 2009, Paris-Rocquencourt, France, Jun. 2-5, 2009. Proceedings 7 (pp. 1-12).
Behnia, R., Yavuz, A. A., Ozmen, M. O., & Yuen, T. H. (2020). Compatible Certificateless and Identity-Based Cryptosystems for Heterogeneous IoT. In Information Security: 23rd International Conference, ISC 2020, Bali, Indonesia, Dec. 16-18, 2020, Proceedings 23 (pp. 1-12).
Bernstein, D., et al. (2015). SPHINCS: practical stateless hash-based signatures. In Annual international conference on the theory and applications of cryptographic techniques (pp. 1-22).
Buchmann, Johannes, et al. (2013)"On the security of the Winternitz one-time signature scheme." International Journal of Applied Cryptography 3.1: (pp. 1-17).
Buchmann, J., Dahmen, E., & Hülsing, A. (2011). XMSS—a practical forward secure signature scheme based on minimal security assumptions. In Post-Quantum Cryptography: 4th International Workshop, PQCrypto 2011, Taipei, Taiwan, Nov. 29-Dec. 2, 2011. Proceedings 4 (pp. 1-22). Springer Berlin Heidelberg.
Cronin, E., Jamin, S., Malkin, T., & McDaniel, P. (2003). On the performance, feasibility, and use of forward-secure signatures. In Proceedings of the 10th ACM conference on Computer and communications security (pp. 1-15).
Crosby, S. A., & Wallach, D. S. (Aug. 2009). Efficient data structures for tamper-evident logging. In USENIX security symposium (pp. 317-334).
Delgado-Mohatar, O., Sierra, J. M., Brankovic, L., & Fuster-Sabater, A. (2010). An energy-efficient symmetric cryptography based authentication scheme for wireless sensor networks. In Information Security Theory and Practices. Security and Privacy of Pervasive Systems and Smart Devices: 4th IFIP WG 11.2 International Workshop, WISTP 2010, Passau, Germany, Apr. 12-14, 2010. Proceedings 4 (pp. 332-339). Springer Berlin Heidelberg.
Ghosh, S., & Sarkar, P. (2021). Variants of Wegman-Carter message authentication code supporting variable tag lengths. Designs, Codes and Cryptography, 89, 709-736.
Itkis, G., & Reyzin, L. (2001). Forward-secure signatures with optimal signing and verifying. In Advances in Cryptology—CRYPTO 2001: 21st Annual International Cryptology Conference, Santa Barbara, California, USA, Aug. 19-23, 2001 Proceedings 21 (pp. 332-354). Springer Berlin Heidelberg.
Johnson, D., Menezes, A., & Vanstone, S. (2001. The elliptic curve digital signature algorithm. Department of Combinatorics and Optimization, University of Waterloo, Canada. pp. 36-63. (DOI) 10.1007/s102070100002.
Kampanakis, P., & Yavuz, A. A. (2015). BAFi: a practical cryptographic secure audit logging scheme for digital forensics. Security and Communication Networks, 8(17), 3180-3190.
Katz, J., & Lindell, A. Y. (2008). Aggregate message authentication codes. In Cryptographers' Track at the RSA Conference (pp. 155-169). Berlin, Heidelberg: Springer Berlin Heidelberg.
Ma, D. (2008). Practical forward secure sequential aggregate signatures. In Proceedings of the 2008 ACM symposium on Information, computer and communications security (pp. 1-10).
Ma, D. and Tsudik, G. (2009). A new approach to secure logging. ACM Trans. Stor., 5, 1, Article 2 (Mar. 2009), 21 pages. DOI = 10.1145/1502777.1502779 http://doi.acm.org/10.1145/1502777.1502779.
Ma, D., & Tsudik, G. (2007). Forward-secure sequential aggregate authentication. In 2007 IEEE Symposium on Security and Privacy (SP'07) (pp. 1-10). IEEE.
Malkin, T., Micciancio, D., & Miner, S. (2002). Efficient generic forward-secure signatures with an unbounded number of time periods. Department of Computer Science and Engineering, University of California, San Diego. (pp. 1-18).
Marson, G. A., & Poettering, B. (2013). Practical secure logging: Seekable sequential key generators. In Computer Security-ESORICS 2013: 18th European Symposium on Research in Computer Security, Egham, UK, Sep. 9-13, 2013. Proceedings 18 (pp. 111-128). Springer Berlin Heidelberg.
Marson, G. A., & Poettering, B. (2014). Even more practical secure logging: Tree-based seekable sequential key generators. In Computer Security-ESORICS 2014: 19th European Symposium on Research in Computer Security, Wroclaw, Poland, Sep. 7-11, 2014. Proceedings, Part II 19 (pp. 37-54). Springer International Publishing.
Mu, Y., Susilo, W., & Zhu, H. (Mar. 2007). Compact sequential aggregate signatures. In Proceedings of the 2007 ACM symposium on Applied computing (pp. 249-253).
Ozmen, M. O., Yavuz, A. A., & Behnia, R. (Jun. 2019). Energy-aware digital signatures for embedded medical devices. In 2019 IEEE Conference on Communications and Network Security (CNS) (pp. 55-63). IEEE.
Seyitoglu, E. U., Yavuz, A. A., & Ozmen, M. O. (Jun. 2020). Compact and resilient cryptographic tools for digital forensics. In 2020 IEEE Conference on Communications and Network Security (CNS) (pp. 1-9). IEEE.
Shamir, A., & Tauman, Y. (2001). Improved online/offline signature schemes. In Advances in Cryptology—CRYPTO 2001: 21st Annual International Cryptology Conference, Santa Barbara, California, USA, Aug. 19-23, 2001 Proceedings 21 (pp. 355-367). Springer Berlin Heidelberg.
Shamir, A. (1985). Identity-based cryptosystems and signature schemes. In Advances in Cryptology: Proceedings of CRYPTO 84 4 (pp. 47-53). Springer Berlin Heidelberg.
Shoup, V. (2001). A proposal for an ISO standard for public key encryption. Cryptology ePrint Archive (pp. 1-63).
Ma, D., & Tsudik, G. (2008). A new approach to secure logging. In Data and Applications Security XXII: 22nd Annual IFIP WG 11.3 Working Conference on Data and Applications Security London, UK, Jul. 13-16, 2008 Proceedings 22 (pp. 1-20). Springer Berlin Heidelberg.
Yavuz, A. A. (Apr. 2013). Eta: efficient and tiny and authentication for heterogeneous wireless systems. In Proceedings of the sixth ACM conference on Security and privacy in wireless and mobile networks (pp. 67-72).
Yavuz, A. A., & Ning, P. (2009). BAF: An efficient publicly verifiable secure audit logging scheme for distributed systems. In 2009 Annual Computer Security Applications Conference (pp. 1-10). IEEE.
Yavuz, A. A., & Ning, P. (2009). Hash-based sequential aggregate and forward secure signature for unattended wireless sensor networks. In 2009 6th Annual International Mobile and Ubiquitous Systems Networking & Services, MobiQuitous (pp. 1-10). IEEE.
Yavuz, A. A., & Ning, P. (2012). Self-sustaining, efficient and forward-secure cryptographic constructions for unattended wireless sensor networks. Ad Hoc Networks, 10(7), 1204-1220.
Yavuz, A. A., Ning, P., & Reiter, M. K. (2012). BAF and FI-BAF: Efficient and publicly verifiable cryptographic schemes for secure logging in resource-constrained systems. ACM Transactions on Information and System Security (TISSEC), 15(2), 1-28.
Yavuz, A. A., Ning, P., & Reiter, M. K. (2012). Efficient, compromise resilient and append-only cryptographic schemes for secure audit logging. In Financial Cryptography and Data Security 16th International Conference, FC 2012, Kralendijk, Bonaire, Feb. 27-Mar. 2, 2012, Revised Selected Papers 16 (pp. 1-15). Springer Berlin Heidelberg.

\* cited by examiner

PUBLICLY VERIFIABLE AND RESILIENT SYMMETRIC AUTHENTICATION AND PRIVACY SYSTEMS AND RELATED METHODS

CROSS-REFERENCE TO RELATED APPLICATIONS

This application claims the benefit of U.S. Provisional Patent Application Ser. No. 63/316,024, filed Mar. 3, 2022, the disclosure of which is hereby incorporated by reference in its entirety, including all figures, tables, and drawings.

STATEMENT OF GOVERNMENT SUPPORT

This invention was made in part with government support under Award Number CNS-1917627 awarded by the National Science Foundation. The government has certain rights in the invention.

TECHNICAL FIELD

The technology discussed below relates generally to improved methods for how two or more computational systems can compute authentication and privacy tasks, and more particularly, to systems and methods for facilitating secure communications using cryptographic systems.

BACKGROUND

Modern computational systems, which can include large computational systems such as server resources as well as devices (e.g., IoT devices) with limited computational and power resources, are often required to collect and process a vast variety of sensitive information. To accomplish this in a secure manner, these systems often rely upon cryptographic security techniques to protect authenticate and protect messages sent among individual computational resources. However, existing cryptographic techniques require computational steps that create a high power and computational burden. While this may be acceptable for high power, high computational capacity resources like remote cloud servers, meeting the power and computational requirements of cryptographic methods by mobile and IoT devices is increasingly difficult.

Without reliable and trustworthy security systems that can practically be implemented by low-resource devices, sensitive information generated by these devices (which are often in direct interaction with individuals, such as in their homes and offices) may be vulnerable to attackers. What are needed are systems and methods that allow for rigorous cryptographic security methods, but which can be implemented on low-power, low computational capacity devices, in order to address one or more of these shortcomings.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method, a system, and/or an apparatus for publicly verifiable symmetric cryptography is disclosed. The method includes: generating, at a generator, an initial private key based on a security parameter; generating, at the generator, a homomorphic private key and a homomorphic public key based on the security parameter; generating, at the generator, an initial encrypted key based on the homomorphic public key and the initial private key; obtaining, at a signer, the initial private key; obtaining, at a verifier, the initial encrypted key and the homomorphic public key; generating, at the signer, an initial signature based on an initial hashed value of a first message and the initial private key; obtaining, at the verifier from the signer, the first message and the initial signature; calculating, at the verifier, the initial hashed value of the first message; setting, at the verifier, a cryptographic function of the initial hashed value of the first message and the initial private key; generating, at the verifier, an evaluated value based on the cryptographic function, the homomorphic public key, the initial encrypted key, and the initial hashed value of the first message; and transmitting, at the verifier, a verification result based on a hashed value of the initial signature and the evaluated value.

In another example, a method, a system, and/or an apparatus for publicly verifiable symmetric cryptography at a verifier is disclosed. The method, the system, and/or the apparatus includes obtaining an initial encrypted key and a homomorphic public key; obtaining a first message and an initial signature; calculating an initial hashed value of the first message; setting a cryptographic function of the initial hashed value of the first message and an initial private key; generating an evaluated value based on the cryptographic function, the homomorphic public key, the initial encrypted key, and the initial hashed value of the first message; and transmitting, at the verifier, a verification result based on a hashed value of the initial signature and the evaluated value.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
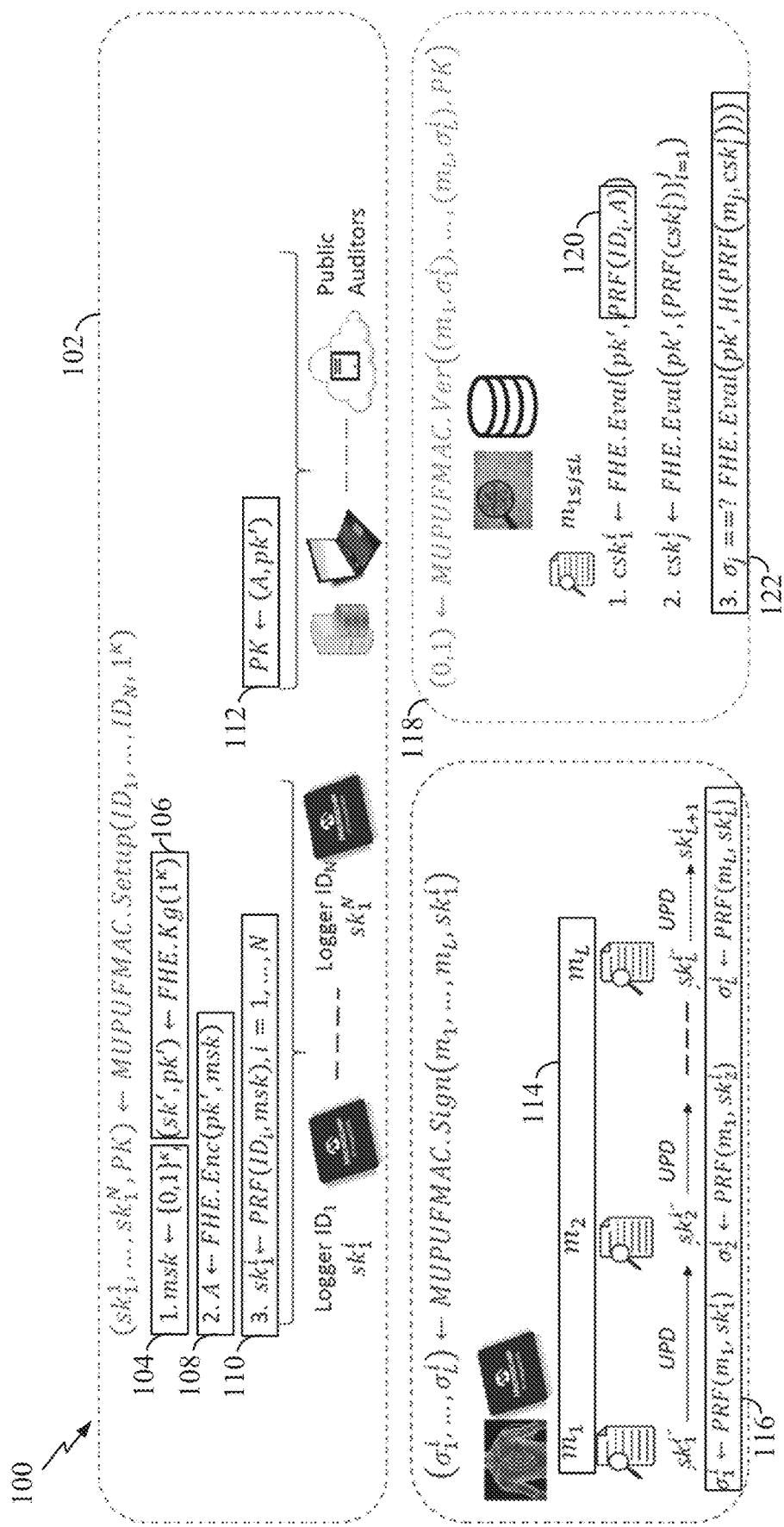
FIG. 1 is an illustration of an example of high-level description of multi-logger forward secure publicly verifiable message authentication code according to some aspects of the disclosure.

This present disclosure discusses technology for publicly verifiable and resilient symmetric authentication and privacy systems and related methods. Computer systems, especially those which interact with users via mobile and IoT devices, can collect and process a wide variety of sensitive information. As one example, this information can include audit logs that maintain the history of critical events on a machine such as system states, security incidents, and failures. Hence, audit logs are some important aspects of some types of digital forensic analysis in computer systems and play a central role in law investigations and legal dispute resolution. Due to their forensic value, logs are among the primary targets of cyber-attackers. For instance, an attacker breaching into a computer can erase its traces and/or implicate innocent users by tampering with audit logs. Moreover, audit logs are usually highly correlated with sensitive information and meta-data gathered in a computer (e.g., medical information, financial information, etc.), which puts a prime on their importance. Therefore, in instances where audit logs are being utilized, the trustworthiness of computer systems depends on the security and privacy of audit logs. However, it is to be understood that any sensitive information (e.g., personal information, patient health information, location information, financial information, etc.) that is desired to be transmitted securely and privately can benefit from the teachings herein just as audit log information does.

The cyber-security of emerging wireless systems (e.g., Internet of Things (IoT)) especially needs trustworthy audit logging to ensure secure and reliable operations. Heterogeneous IoTs can involve vast quantities of (often resource-limited) IoT devices that collect sensitive information and then report to more resourceful entities (e.g., edge to cloud) for analysis. A heterogeneous healthcare IoT application, for example, may involve a large number of different medical devices (e.g., embedded/wearable sensors, handheld tablets) that gather highly sensitive data from patients and then report it to doctors, hospitals, and insurance companies for diagnosis and analysis. It can be a highly challenging yet critical task to ensure the trustworthiness of audit logs in such medical systems, which produce a large amount of sensitive log information under resource limitations (e.g., battery, CPU, memory) and in the presence of active adversaries.

Cryptographic mechanisms form the basis of trustworthy audit logging as well as security for other types of sensitive data (e.g., medical, financial). They provide essential services such as authentication, integrity, and privacy while also offering some advanced security features (e.g., forward-security). An ideal cryptographic mechanism should offer public verifiability and non-repudiation, compromise-resiliency, aggregation and holistic integrity, and high efficiency. The present disclosure discusses systems and methods for achieving these properties simultaneously.

Public verifiability and non-repudiation: Public verifiability and non-repudiation properties involve allowing any entity to verify the trustworthiness of sensitive information (e.g., logs, medical data) without learning their corresponding secret keys. As one example, these properties can be used in forensics and legal dispute resolution (e.g., financial, health care) in which the logs are investigated without violating the user's privacy and integrity.

Compromise-resiliency: Attackers often target wireless devices to extract valuable information by breaching these systems via malware infiltration or other means. Hence, the log and data protection techniques described herein can offer compromise-resiliency properties such as forward-security, wherein the cryptographic protection prior to attack remains valid even if the current key is exposed. Similarly, the breach of a central server should not expose all relevant users in the system.

Aggregation and holistic integrity: With respect to aggregation and holistic integrity properties, the cryptographic storage and transmission overhead can be substantial due to the high volume of sensitive data and logs generated by IoT devices. The authentication tag (signature) aggregation can compress the signatures, thereby mitigating this overhead. It can also not only guarantee the integrity of individual logs or data, but also the entire log/data trail to prevent re-ordering and selective deletion.

High efficiency: With respect to high efficiency properties, heterogeneous IoT devices (e.g., embedded medical sensors, home appliances, wearables, etc.) are resource-limited (e.g., battery, CPU), yet expected to operate long durations without a replacement. Thus, it is an important design consideration for cryptographic protection mechanisms to respect the resource limitations of IoT and wireless systems.

Regarding symmetric cryptography, some symmetric key-based techniques may rely on Message Authentication Codes and symmetric ciphers. Some of these techniques offer forward-security, aggregation, and all-or-nothing property that permit a high level of security/privacy for the audit log. Furthermore, these advanced security features may be offered via a few Pseudo Random Function (PRF) and cryptographic hash calls. As a result, these primitives are near-optimally computationally efficient with small authentication tags, which can be useful for protecting audit logs on resource-limited IoT platforms in terms of cost-efficiency. However, despite high efficiency, symmetric cryptography-based approaches have several drawbacks that may limit their application to several important IoT applications. That is, they cannot achieve public verifiability and non-repudiation, since the signer/encryptor and verifier(s) share the same symmetric key. This can prevent the resolution of disputes requiring a public audit, which is a vital feature for digital forensics. The symmetric primitives are not scalable for systems with a large number of components due to key management and distribution hurdles. Moreover, they are vulnerable to key compromises in central architectures. For example, assume that the medical cloud system gathering the audit logs is compromised. This may expose the symmetric keys used in medical IoT devices, thereby undermining the security and privacy of millions of users.

Regarding public key cryptography, digital signatures and public key encryption rely on Public Key Infrastructures (PM), and therefore may be scalable for massive IoT applications. Moreover, digital signatures can achieve public verifiability and non-repudiation. Accordingly, these techniques may be suitable for IoT applications that involve financial transactions and/or other sensitive information (e.g., medial, personal data). Despite this, Public Key Cryptography (PKC) approaches incur heavy overhead, especially when advanced security properties are considered. Traditional digital signatures (e.g., ECDSA, RSA, and PKC encryption) may be used to secure audit logs. However, these basic approaches have several main limitations. PKC-based signature and/or encryption requires costly operations (e.g., exponentiations, elliptic curve scalar multiplications) that are several magnitudes of times more costly than symmetric cryptography approaches. Moreover, they do not offer advanced features such as forward-security and aggregation, which can enhance the security and compactness of the audit logs. The achievement of advanced features substantially increases the cryptographic overhead, which might not be practical for heterogeneous IoT applications. However, the limitations of PKC-based audit logging methods can be elaborated with advanced features.

The forward security can insure the authenticity and integrity of data items before an attack point. This can be achieved by evolving the secret key periodically (e.g., per signing). Forward secure signatures can substantially enhance the breach resiliency, and therefore have various applications in IoTs and forensics. However, they introduce a new signature and/or public key per log entry, and therefore incur a high computation and storage/transmission overhead. Forward-secure and Aggregate Signatures (FOSA) can permit authentication tag aggregation that reduces the logger storage/transmission overhead. Some FOSA schemes can also offer an "all-or-nothing" property which can ensure the integrity of the entire log trail to prevent re-ordering and selective deletion. FOSA schemes involve several performance and security trade-offs. FssAgg, for example, had variants with sub-linear signature and public key sizes that were flawed. FssAgg-BLS, as another example, involves a K-time signature scheme with O(K) public key size which requires a cryptographic pairing per message verification, and therefore is costly. BAF schemes, as another example, may be relatively computationally efficient but still require O(K) public key size. CORE scheme, as another example, may achieve sub-linear key and signature sizes, but requires multiple EX scalar multiplications both at the logger and verifier sides. Forward-secure schemes with selective verification capabilities can support FOSA constructions. The present disclosure provides cryptographic schemes that preserve the efficiency of symmetric primitives at the encryptor/authenticator (e.g., a wireless sensor logging sensitive data), while achieving public verifiability and advanced features (e.g., forward-security, aggregation, append-only) at the verifier side (e.g., auditors).

The present disclosure provides systems and methods involving creation of a new series of compromise-resilient and compact cryptographic techniques that are as efficient as symmetric schemes at the low-end wireless device (e.g., the logger), but are publicly verifiable and resilient at the verifier side (e.g., auditor), thereby meeting the efficiency and security needs of heterogeneous wireless networks and IoTs. This approach involves enabling a private and trustworthy evaluation of a symmetric FOSA verification process under encryption, thereby permitting audit logs to be inspected either publicly or in a distributed setting without disclosing the secrets of the logger to the verifiers (e.g., auditors). Specifically, the creation of symmetric FOSA techniques at the signer and encryptor (e.g., logging device), and then the evaluation of them under encryption via FHE to offer non-repudiation and verifiability, and the exploration of symmetric FOSA approaches that are most suitable for FHE evaluations. This approach also addresses the conundrum of symmetric cryptographic efficiency versus scalability and public verifiability, thereby making a significant broad impact on trustworthy IoT and digital forensics in various domains such as medical systems, finance, and others.

The present disclosure provides a series of signer-optimal audit logging schemes that transform forward-secure symmetric MACs into a digital signature by evaluating their verification under encryption via FHE can be used. The main scheme can be publicly verifiable forward secure message authentication code (PUFMAC) that executes a key evolving PRF scheme with FHE at the verifier. PUFAMAC that permits the aggregation, holistic integrity, and more efficient FHE evaluations via algebraic MACs can then be created. Further, multi-logger and secure key management capabilities (MUPUMAC) can be developed along with transformations that allow re-usability for one-time hash-based signatures and optimizations to enhance performance. These schemes achieve public verifiability, non-repudiation, and advanced features (i.e., forward-security, aggregation) with thousands of times faster signing/encryption at the sender compared to their alternatives, but with the cost of more expensive verification. This performance characteristic can be highly favorable for heterogeneous IoTs, in which the sender device is strictly resource-limited while verifiers are resourceful.

A system model can be designed around heterogeneous IoT systems where battery-powered and low-end devices (which may need to operate for long periods of time) transmit signed measurements to the resourceful verifiers (e.g., a laptop). There are three types of entities in this system model. The first is the signer, which is deemed to be highly resource-limited. The signer is not expected to store and/or communicate the public keys, it only uses its private key to compute the signature a. This is crucial to enable efficient signing and to meet the stringent requirements of the low-end signer in the system model. The second is the verifier, which is considered to be a resourceful machine (e.g., commodity hardware) with high bandwidth connection. The third is an optional outsourced public key server that supplies verifiers one-time public keys on demand.

At the signer side, the schemes only harness near-optimal efficient symmetric primitives. At the verifier side, they rely on FHE to evaluate symmetric primitives under encryption. A simplified notation is: (sk', pk')←FHE. Kg($1^\kappa$) produces a FHE private/public key pair. The encryption functions are c←FHE·Enc(pk',m) and m←FHE·Enc(sk', c), respectively, and FHE·Eval(pk',$\mathcal{F}$,I) evaluates a function $\mathcal{F}$ represented with circuit C on input I including $\vec{c}$ via applying encrypted additions and multiplications as ($c_1+c_2$)←FHE·Add(pk',$c_1$, $c_2$) and ($c_1 \cdot c_2$)←FHE·Mul(pk', $c_1$, $c_2$), respectively. Further, $$r \xleftarrow{\$} \{0, 1\}^\kappa$$

means variable r is a is a random uniformly generated K-bit integer. Potential extra parameters (e.g., state, randomization) are omitted from the notation for the sake of brevity. In some examples, FHE is only used at the resourceful receiver side, while the resource-limited signer only relies on near-optimal efficient operations.

The technical approach includes transforming a symmetric MAC into a digital signature by permitting its public verification via private evaluations of MAC under FHE. The idea is to evaluate PRF calls under FHE to unable a public verification of MAC at the verifier side. This strategy with basic scheme referred to as Publicly Verifiable Forward Secure Message Authentication Code (PUFMAC) is demonstrated below. Note that MAC output and signature terms are referred to interchangeably when applicable, since the MAC computed at the logger is verified as a signature at the verifier side.

1) Key Generation (offline): Let $$sk_1 \xleftarrow{\$} \{0,1\}^\kappa$$

be the initial MAC private key of the signer, where $\kappa$ is the security parameter. Set $(sk', pk') \leftarrow FHE \cdot Kg(1^\kappa)$. Here, $sk_1$ is FHE encrypted as $A_1 \leftarrow FHE \cdot Enc(pk', sk_1)$. The $sk_1$ and $PK=(pk', A_1)$ are given to the logger (signer) and auditors (verifiers), respectively.

2) Log Signing: Given a log entry $m_j$, the signer computes a MAC (signature) $\sigma_j \leftarrow MAC(h_j, sk_j)$, where $h_j \leftarrow H(m_j)$, H is a cryptographic hash function and MAC is PRF-based. The signer then updates the private key as $sk_{j+1} \leftarrow UPD(sk_j)$ and deletes $sk_j$, where UPD is one-way key update function (e.g., H or a keyed PRF). Let's assume the end of a reporting period, the signer sends log entries and signatures $(\vec{m}=\{m_j\}_{j=1}^L, \vec{\sigma}=\{\sigma_j\}_{j=1}^L)$ to the log verifier.

3) Log Verification: Given $(\vec{m}, \vec{\sigma})$, the auditor (log verifier) computes and sets function $\mathcal{F}:H(PRF(h_j, sk_j))$, where the MAC operation is realized with PRF. The auditor then evaluates $h_j' \leftarrow FHE \cdot Eval(pk', \mathcal{F}, I)$, where $I=(A_j, h_j)$. If $H(\sigma_j) \neq h_j'$; then abort (verification fails), else $(m_j, \sigma_j)$ is verified. The auditor runs $A_{j+1} \leftarrow FHE \cdot Eval(pk', UPD, A_j)$, and deletes $A_j$. If all $\{m_j\}_{j=1}^L$ verifies, then the auditor attests the authenticity of these log entries.

Regarding some design features of PUFMAC, one may notice that an extra H operation is performed before applying MAC to message $m_j$. While traditional MACs by default compress large data, PUFMAC at the verifier side acts as the digital signatures. Hence, $m_j$ is hashed to ensure efficiency at the verifier side, where only a single-compact data block is evaluated under FHE. The evaluation of $\mathcal{F}$ under FHE involves an extra H on PRF output. This is to prevent the auditor from using a signature verification process as a "MAC oracle." That is, without invoking this extra hash, any entity can obtain $\sigma$ on a given message from pk. To prevent this, the encrypted evaluation of $\mathcal{F}$ outputs the hash of $\sigma$, which does not reveal but can verify it later when provided by the signer. One may consider only evaluating PRF and comparing it with $\sigma$ under the encryption, but efficient comparison under FHE is an open research problem. This complication can be avoided by just introducing the extra has computation over PRF output. Forward-security mitigates the risk of key compromises by periodically evolving the key. This prevents an attacker from compromising the current key to forge/decrypt messages protected with old keys. The use of UPD per message or time period on sk ensures the forward security. The verifier can pre-compute $A_j$ beforehand, which accelerates the verification with a cost of extra storage.

In some implementations, different schemes that can enable compactness and extra integrity features for PUF-MAC can be used. Forward-secure and aggregate (FOSA) schemes integrate signature aggregation into the process by reducing linear signature size to a small constant size. Some variants of FOSA schemes also offer an "all-or-nothing" property, which guarantees that an adversary cannot selectively delete the parts of log entries without being detected. A starting point may be symmetric FOSA schemes, however these do not achieve public verification since they do consider the verification under the FHE. Moreover, they only use traditional MACs and a hash-based aggregation.

Publicly verifiable FOSA schemes can be built from both traditional and algebraic MACs. In FOSA, an intermediate (cumulative) $\sigma_{1,j}=MAC(\sigma_{1,j-1} \circ \sigma_j, sk_j)$ can be generated, where $\circ$ is an aggregation function. The function $\circ$ can be an algebraic function (e.g., modular addition/multiplication, XOR), a keyed PRF, or just H. The outcome is a single-compact $\sigma_{1,L}$ on $(m_1, \ldots, m_L)$. PUFMAC with such aggregation capabilities can be referred to as PUFAMAC. The aggregation at the logger side remain near-optimal, but PUFAMAC requires a different verification strategy than that of PUFMAC. Unlike PUFMAC·Ver verifying MACs under encryption independently, PUFAMAC needs to verify $\sigma_{1,L}$ depending on all previously computed MACs. Therefore, in PUFAMAC, intermediate aggregate MACs can be kept under encryption to prevent leakages. PUFAMAC can be showcased with keyed PRF as the aggregation as demonstrated below.

Let $\sigma_{1,j}=MAC(\sigma_{1,j-1}\|\sigma_j, sk_j)$ be intermediate aggregated MAC on $(m_1, \ldots, m_j)$. At the verifier side, the corresponding intermediate encrypted value is $cs_j \leftarrow FHE \cdot Eval(pk', PRF(\sigma_{1,j-1}\|PRF(h_j, sk_j), sk_j), I)$ where $I=(cs_{j-1}, A_j, h_j)$. The final step is to check if $H(\sigma_{1,L})==FHE \cdot Eval(pk', H, cs_{1,L})$ on $\{m_j\}_{j=1}^L$. The rest of signing and UPD at the logger and auditor are as in PUFMAC. The verification in this instantiation of PUFAMAC may be more than twice as costly as in PUFMAC. It not only requires two PRF evaluations under encryption, but it also processes two blocks of information in one of the PRF calls. Hence, it can be expected to incur a larger ciphertext expansion. Yet, PUFAMAC is still feasible at the verifier side, while offering both forward-secure, small-constant size signature for a linear number of audit logs with the truncation safety via all-or-nothing property.

Additionally, PUFAMAC instantiations that harness algebraic MAC and aggregation techniques can be used. For instance, algebraic Carter-Wegman style MACs may be suitable for aggregation. Begin by focusing on a one-time MAC as $\sigma=MAC(h, sk)=K_1 \cdot h+K_2$, where arithmetic is in a suitable field (e.g., $F_q$) and $sk=(K_1, K_2)$ are one-time PRF outputs. It is easy to see that this MAC can be aggregated with a modular addition operation. A potential advantage of this MAC is that its FHE evaluation might be more efficient than PRF-based MACs. This strategy can be exemplified as follows: let $A_1 \leftarrow FHE \cdot Enc(pk', K_1)$ and $A_2 \leftarrow FHE \cdot Enc(pk', K_2)$. To form a under encryption, only $A_1 \cdot FHE \cdot Enc(pk', h)+A_2$ is needed, and then a hash of a under FHE as in PUFAMAC. The cost of such algebraic MAC can be analyzed and compared with PUFAMAC instantiated with only keyed PRF. Here, the key update cost of this algebraic MAC is twice that of PUFAMAC as is. However, the evaluation is only an encryption, and then just multiplication and addition. Hence, by pre-computing key update operations, the online verification cost might be more efficient than that of PUFAMAC. It is also notable to investigate short MACs with smaller security parameters and key sizes. For example, a 64-bit short algebraic MAC can be highly efficiently built using this strategy. A single 128-bit PRF output can offer two key pieces, which then can be effectively used to operate algebraic MAC under the encryption.

In a typical IoT forensic system, a large number of IoT devices collect sensitive data, and then report it to a central cloud system along with the relevant forensic information.

Therefore, a cryptographic digital forensic tool can offer efficient multi-logger authentication capability. Despite their efficiency, one of the main limitations of symmetric key based cryptographic forensic tools is the lack of scalability, which stems from the hurdles of key distribution and management. Strategies to achieve scalable signature verification for our constructions can be developed.

FIG. 1 is an illustration of an example of high-level description of multi-logger forward secure publicly verifiable message authentication code (MUPUMAC) 100 according to some aspects of the disclosure. A starting point can be a non-forward secure version of PUFMAC, where both the logger and auditor use the same sk during the entire authentication process. This variant can be referred to as Multi-logger PUMAC (MUPUMAC) 100. An identity-based key derivation strategy can be used to verify all signatures generated by different loggers via a single master public key. At the key generation 102, a system-wide master secret key 104

$$msk \xleftarrow{\$} \{0, 1\}^\kappa$$

can be produced based on a security parameter $\kappa$, and a public key and a secret key 106 can be produced based the key generation function (FHE·Kg) and the security parameter $\kappa$. Each logger is given a private key 110 $sk^i \leftarrow PRF(ID_i, msk)$ (the PRF input can be hashed to speed up verifier FHE evaluation). The system-wide master secret key msk can be sealed 108 as $A \leftarrow FHE \cdot Enc(pk', msk)$, a system-wide public key 112 can be generated as $PK=(pk', A)$. And the logger secret key $sk^i$ is provided to each logger ID $ID_i$. The MAC generation of $ID_i$ is as in PUFMAC excluding the key update, where the signature 116 $\sigma^i \leftarrow MAC(h, sk^i)$ and $h \leftarrow H(m)$. The logging device $ID_i$ signs log entries 114 $(m_1, \ldots, m_L)$. The verification 118 involves an extra PRF call 120 to first derive the private key of $ID_i$ under encryption, and then verify the signature as in PUFMAC. That is, the auditor checks 122 if $H(\sigma)=FHE \cdot Eval(pk', \mathcal{F}, I)$ holds, where $\mathcal{F}:H(PRF(h,PRF(ID_i,msk)))$ and $I=(A,h)$ to verify the signature. MUPUMAC has several advantages. First, it acts as an ID-based signature scheme that has only one public key for all signers, without requiring an explicit certificate. That is, if an identity that is not part of the system is used, the signature verification will fail. MUPUMAC is only twice costlier at the verifier than that of PUFMAC. Since it does not require storing a linear number of public keys (i.e., one for each $ID_i$), it is a much more verifier storage efficient alternative but without forward-security.

One can also consider multi-logger capability for PUFMAC and PUFAMAC. PUFAMAC can be transformed into multi-logger style by following the aforementioned strategy, but with a computation-storage trade-off at the verifier side. The multi-logger PUFMAC can be referred to as MUPUFMAC, in which every logger $ID_i$ continuously evolves its private key as $sk_j^i \leftarrow UPD(sk_{j-1}^i)$, and deletes $sk_{j-1}^i$. The verifier must first derive the root (initial) key of $ID_i$ under FHE as $csk_1^i \leftarrow FHE \cdot Eval(pk', PRF(ID_i, msk))$, and then run an update function j times to verify $(m_1^i, \ldots, m_L^i)$. MUPUFMAC is illustrated in FIG. 1 and as discussed above.

It should be noted that for a large number of distinct log entries (i.e., large L), this approach may incur heavy computation overhead to the verifier. The overhead is higher in PUFAMAC due to extra PRF evaluation and input side. As an alternative, the verifier can maintain the intermediate encrypted private key $A_j^i$ per $ID_i$; however, this incurs N (linear) public key storage for N logging devices. One can aim to devise unique strategies to alleviate this key update burden. For example, assume that from time to time, by accepting an interaction between $ID_i$ and the verifier, one can use a "hint" $x_j$ to $ID_i$ that enables $ID_i$ to derive $sk_{i+1}^i$ from $sk_j^i$. One can use symmetric ciphers or pseudo-random permutations to achieve this goal. Potential "hint" strategies and their cost are discussed in more detail below.

It is possible to harness FHE to transform some one-time signatures into re-usable signatures. Specifically, hash-based one-time signatures can be highly signing efficient and also post-quantum secure. Yet, they can only be used once (or a few times), and afterwards the private/public key pair must be renewed. The creation, distribution and verification of one-time public keys make the stand-alone use of such OTS impractical. Signature schemes typically rely on Merkle-tree based strategies to transform such OTS into multiple-time signatures, wherein a single-compact public key can be used to verify several signatures. Despite their merits, these techniques usually introduce very large signature sizes (e.g., 41 KB for SPHINCS) and heavy signer overhead, which can be highly expensive for resource-limited signers.

Consider a starting point of HORS, which is the basis of SPHINCS and XMSS. The key generation produces t private/public key components $sk=(s_1, \ldots, s_t)$ and $PK=(v_1 \leftarrow f(s_1), \ldots, v_t \leftarrow f(s_t))$. The signer later discloses k out of t elements $(s_{i_1}, \ldots, s_{i_k})$ that are chosen by indexes from $h \leftarrow H(m)$, where h is split into $h_1, h_2, \ldots, h_k$ are of length $\log_2(t)$-bits and interpreted as integers $\{i_j\}_{j=1}^k$. The verifier computes $h \leftarrow H(m)$, and then checks if $\{f(s_{i_j})==v_{i_j}\}_{j=1}^k$ hold, where indexes are from h as in the signing.

A method that can enable re-usable HORS signatures by permitting verifiers to obtain public keys from encrypted FHE evaluations from a master private key can be used. In line with MUPUMAC, this strategy includes encrypting msk and then deriving the corresponding PK of a logger $ID_i$ via PRF FHE evaluations. This high-level idea is outlined below follows.

At the key generation, one can create and then seal a master key as $A \leftarrow FHE \cdot Enc(pk', msk)$, where $$msk \xleftarrow{\$} \{0, 1\}^\kappa$$

and set $PK=(A, pk')$. Each $ID_i$ is given a root key $r^i \leftarrow PRF(ID_i, msk)$, and the verifiers are given PK. Given a message $m_j$, the signer can derive $sk_j^i \leftarrow \{PRF(r^i\|j\|l)\}_{l=1}^t$ and releases k components of it as in HORS signature (or alternatively only derive corresponding components). Given $m_j$, a verifier can derive the corresponding public key of $ID_i$ as $pk_i^j=FHE \cdot Eval(pk', \mathcal{F}, I)$, where $\mathcal{F}:\{PRF(PRF(PRF(ID_i, msk)\|j\|l))\}_{l=1}^t$ and $I=(A,j)$, and then verify the signature as in HORS (the inner PRF can be called only once and reused under FHE). As in MUPUMAC, this approach enables an ID-based signature, but this time for HORS, which can be re-used without introducing any extra burden to the signer.

It should be noted that this construction requires 2t+1 PRF FHE evaluations per public key generation at the verifier side, which can be expensive. However, the public key derivation overhead can be outsourced to a public key generation server, which can then supply public keys to the relevant auditors at any time needed. In this case, the overhead of auditor is only a HORS verifier plus a communicator with the public key generation server. The public keys can also be generated offline to accelerate the process, and the achievement of forward-security may require incorporating ratcheting mechanisms as discussed with respect to PUFMAC.

At the sender side, these schemes have identical performance to symmetric primitives, and therefore will show a near-optimal performance. Hence, compared to existing digital signatures and PKC-based encryption, they are several magnitudes of times more computationally efficient, with at least a magnitude of smaller signature sizes. This is especially the case when compared with signature and encryption schemes with advanced features such as forward-security and aggregation. It should be noted that, assuming the underlying FHE scheme is post-quantum secure (e.g., a quantum-safe lattice-based FHE), these schemes also achieve post-quantum security. In this case, their performance superiority is even greater over existing post-quantum secure alternatives. As discussed above, compared to some symmetric primitives, the techniques discussed in the present disclosure may enjoy all the benefits of PKC-based schemes such as public verification, non-repudiation and high-scalability, all of which are not offered as omni-symmetric cryptography based solutions.

At the verifier side, these schemes in some implementation can be more expensive than more traditional signature and encryption alternatives. For example, these schemes have extra computational overhead due to 2-3 PRF evaluations under FHE (a few seconds of evaluation delay). It should be noted that, while being more computationally and storage efficient for evaluation under encryption, some MPC-based alternatives require distributed servers and therefore can be vulnerable to collusion. Hence, these FHE-based alternatives may be ideal for single-server setting, without the same collusion risk.

It should be emphasized that, in a heterogeneous IoT setting, the authenticator/encryptor efficiency is the main metric, while verifiers are resourceful. Being equally efficient to symmetric alternatives, all of the schemes discussed above may achieve this performance objective.

Figure 2:
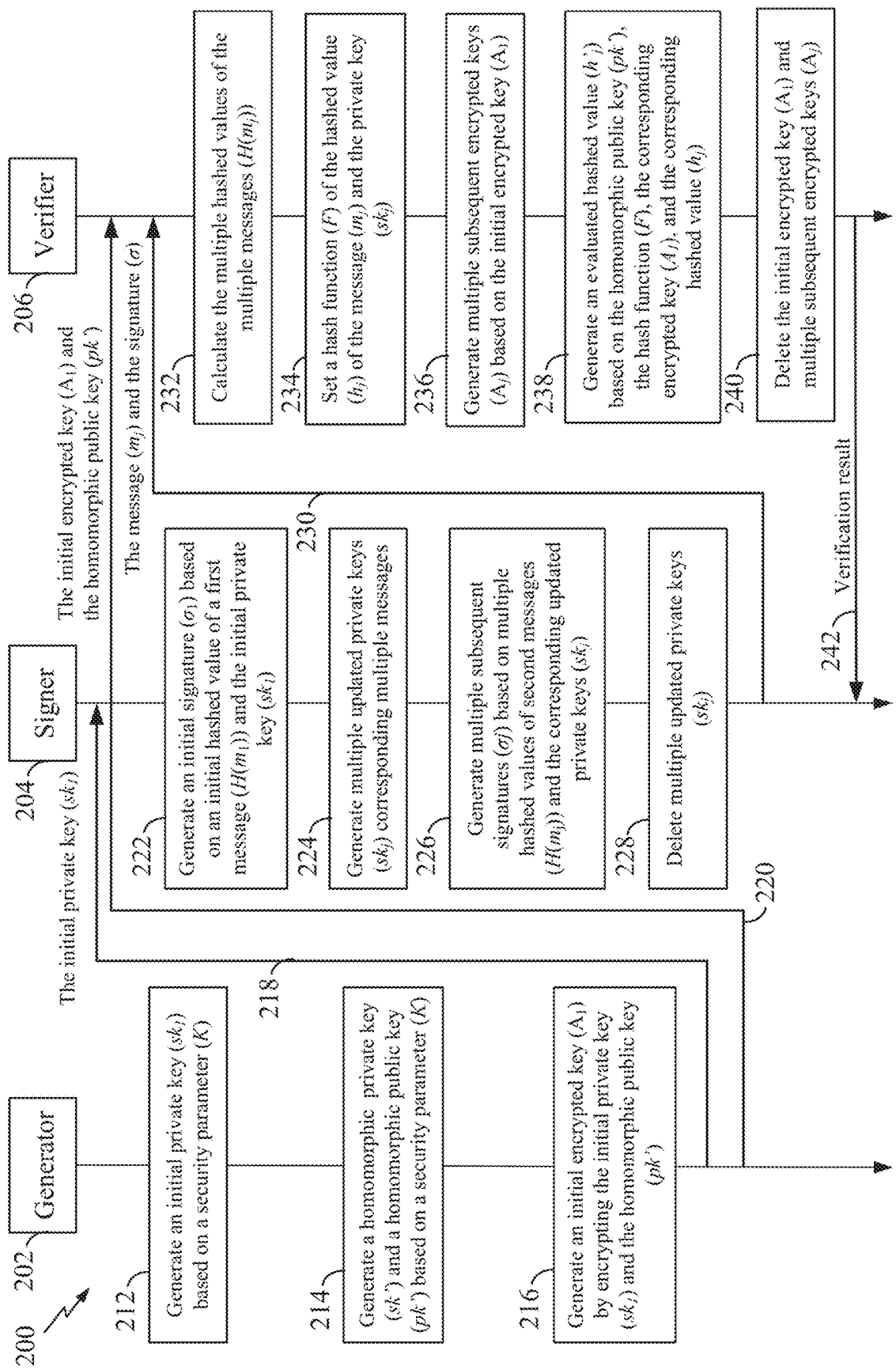
FIG. 2 is a flow chart illustrating an exemplary process for publicly verifiable symmetric cryptography using publicly verifiable forward secure message authentication code (PUFMAC) according to some aspects of the disclosure.

FIG. 2 is a flow chart illustrating an exemplary process for publicly verifiable symmetric cryptography using publicly verifiable forward secure message authentication code (PUFMAC) in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 200. In FIG. 2, three entities (a generator 202, a signer 204, and a verifier 206) can exist to interact each other. However, it should be appreciated that the three entities are logically separated and are not necessarily and physically separated. For example, the generator 202 may be part of the signer 204 or the verifier 206.

Blocks 212 to 216 illustrate a key generation process at the generator 202. In some examples, the key generation process may be performed while the generator 202 is offline.

In block 212, the generator 202 may generate an initial private key ($sk_1$) based on a security parameter (K). For example, the initial private key ($sk_1$) can be generated by using an equation:

$$sk_1 \xleftarrow{\$} \{0, 1\}^\kappa,$$

where κ is the security parameter.

In block 214, the generator 202 may generate a homomorphic private key (sk') and a homomorphic public key (pk') based on the security parameter (K). For example, the homomorphic private (sk') and public (pk') key pair can be generated by using an equation: $(sk', pk') \leftarrow \text{FHE·Kg}(1^\kappa)$, where x is the security parameter, FHE·Kg is the key generation function of the fully homomorphic encryption scheme.

In block 216, the generator 202 may generate an initial encrypted key ($A_1$) based on the homomorphic public key (pk') and the initial private key ($sk_1$). For example, the initial encrypted key ($A_1$) can be generated by encrypting the initial private key ($sk_1$) based on the homomorphic public key using the fully homomorphic encryption scheme using an equation: $A_1 \leftarrow \text{FHE·Enc}(pk', sk_1)$. In some examples, the generator 202 may generate a general public key (PK) based on the homomorphic public key and the initial encrypted key ($A_1$).

In data flow 218, the generator 202 may transmit to the signer 204 the initial private key ($sk_1$), and the signer 204 may obtain the initial private key ($sk_1$). In data flow 220, the generator 202 may transmit to the verifier 206 the general public key (PK) or the initial encrypted key ($A_1$) with the homomorphic public key (pk'). The verifier 206 may obtain the general public key (PK) or the initial encrypted key ($A_1$) with the homomorphic public key (pk').

Blocks 222 to 228 illustrate a process at the signer 204 to generate signatures ($\sigma_j$) for corresponding messages.

In block 222, the signer 204 may generate an initial signature ($\sigma_1$) based on an initial hashed value ($h_1$) of a first message ($m_1$) and the initial private key ($sk_1$). For example, the initial signature ($\sigma_1$) is generated using a message authentication code scheme (MAC). The initial signature is an output of the message authentication code scheme (MAC), and the initial hash value ($h_1$) of the first message ($m_1$) and the initial private key ($sk_1$) are inputs of the message authentication code scheme (MAC). The initial hashed value ($h_1$) of the first message ($m_1$) can be obtained using a cryptographic hash function (H) with an input of the first message ($m_1$). In some examples, the initial signature ($\sigma_1$) can be generated by using an equation: $\sigma_1 \leftarrow \text{MAC}(h_1, sk_1)$, where $h_1 \leftarrow H(m_1)$, H is a cryptographic hash function, and MAC is a pseudorandom function (PRF) based scheme.

In block 224, the signer 204 may generate multiple updated private keys ($\vec{sk} = \{sk_j\}_{j=2}^{L}$) based on the initial private key ($sk_1$). In some examples, a subsequent updated private key ($sk_{i+1}$) may be generated based on a current updated private key ($sk_i$). For example, a first updated private key ($sk_2$) of the multiple updated private keys ($sk_i$) may be generated based on the initial private key ($sk_1$), and a second updated private key ($sk_3$) of the multiple updated private keys ($\vec{sk} = \{sk_j\}_{j=2}^{L}$) may be generated based on the first updated private key ($sk_2$). The multiple updated private keys ($\vec{sk} = \{sk_j\}_{j=2}^{L}$) may be generated by using an equation: $sk_{j+1} \leftarrow \text{UPD}(sk_j)$. In some examples, UPD is a one-way key update function.

In block 226, the signer 204 may generate multiple subsequent signatures ($\sigma_j$) based on multiple subsequent hashed values ($h_j$) of multiple second messages ($m_j$) and multiple updated private keys ($\vec{sk} = \{sk_j\}_{j=2}^{L}$). For example, the signer 204 may generate the multiple subsequent signatures by using an equation: $\sigma_j \leftarrow \text{MAC}(h_j, sk_j)$, where j is greater than 1, $h_j \leftarrow H(m_j)$, H is a cryptographic hash function, and MAC is a pseudorandom function (PRF) based scheme.

In block 228, the signer 204 may delete the initial private key ($sk_1$) and the multiple updated private keys ($\vec{sk}=\{sk_j\}_{j=2}^{L}$). In some examples, the initial private key ($sk_1$) is deleted immediately after the initial private key is updated to a next private key ($sk_2$). Also, a private key ($sk_j$) is immediately deleted right after a corresponding signature ($\sigma_j$) is generated at block 226 (i.e., $\sigma_j \leftarrow MAC(H(m_j),sk_j)$) and the private key ($sk_j$) is updated to a subsequent private key ($sk_{j+1}$) at block 224 (i.e., $sk_{j+1} \leftarrow UPD(sk_j)$). Then, this process is repeated until the last signature ($\sigma_L$) corresponding the last message ($m_L$) is generated.

In other examples, the signer 204 may exploit a per time period basis approach. In this approach, the signer 204 can update keys every time period (e.g., every hour) no matter how many data items are to be signed in that time frame. In this case, the signer 204 can sign all data items collected in the same time period with the same key. For example, if the signer 204 collect 1 million data items in an hour, the signer 204 does not generate 1 million updates anymore, instead, sign all with the same key. It saves a lot of FHE update time for the verifier 206. However, this big saving comes with a sacrifice from forward security. That is, if the adversary compromises the device, forward security will be lost within that time frame. For example, let's say the signer 204 update keys every hour. All signatures computed during the previous hours are forward-secure since the signer 204 deletes old keys. Assume now it is 4 PM, and a user is using key $sk_j$, and the adversary compromises the device on 4:59 PM right before the signer 204 updates $sk_j$. In that case, all 1 million signatures computed in [4-4:59 PM] will lose forward-security, but anything before remains secure. This is a trade-off between update frequency/efficiency and forward-security level. If the signer 204 updates per item, the signer 204 has the best forward-security, but the most cost. If the signer 204 updates time basis, less update cost, but slightly less forward-security.

In data flow 230, the signer 204 may transmit to the verifier 206 the initial and multiple second messages ($\vec{m}=\{m_j\}_{j=1}^{L}$), and the initial and multiple subsequent signatures ($\vec{\sigma}=\{\sigma_j\}_{j=1}^{L}$). The verifier 206 may obtain from the signer 204 the initial and multiple subsequent messages ($\vec{m}=\{m_j\}_{j=1}^{L}$), and the initial and multiple subsequent signatures ($\vec{\sigma}=\{\sigma_j\}_{j=1}^{L}$).

Blocks 232 to 240 illustrates a verification process to verify whether the message(s) from the signer is modified.

In block 232, the verifier 206 may calculate the initial hashed value ($h_1$) of the first message ($m_1$). In some examples, the verifier 206 may also calculate the multiple subsequent hashed values ($\vec{h}=\{h_j\}_{j=2}^{L}$) of the multiple second messages ($\vec{m}=\{m_j\}_{j=2}^{L}$). A hashed value ($h_j$) of a message ($m_j$) may be obtained by using an equation: $h_j=H(m_j)$, where H is the cryptographic hash function.

In block 234, the verifier 206 may set a cryptographic function (H) of the initial hashed value ($h_1$) of the first message ($m_1$) and the initial private key ($sk_1$). In some examples, the verifier 206 may also apply the multiple subsequent hashed values ($\vec{h}=\{h_j\}_{j=2}^{L}$) of the multiple second messages ($\vec{m}=\{m_j\}_{j=2}^{L}$) and the multiple updated private keys ($\vec{sk}=\{sk_j\}_{j=2}^{L}$) to the cryptographic function. In further examples, the cryptographic function includes a hashing function (H) of a pseudorandom function (PRF) with the initial hashed value ($h_1$) of the first message ($m_1$) and the initial private key ($sk_1$). Thus, the cryptographic function (F) may be set as: $\mathcal{F}:H(PRF(h_j,sk_j))$. Here, in an exemplary scenario, the MAC operation is realized with PRF.

In block 236, the verifier 206 may generate multiple subsequent encrypted keys ($\vec{A}=\{A_j\}_{j=2}^{L}$) based on the initial encrypted key ($A_1$). For examples, a subsequent encrypted key ($A_j$) may be obtained by using an equation: $A_{j+1} \leftarrow FHE\cdot Eval(pk',UPD,A_j)$, where FHE·Eval evaluates UPD with an input $A_j$, and UPD is one-way key update function (e.g., H or a keyed PRF). Since this equation is recursive, $A_{j+1}$ can be obtained based on the initial encrypted key ($A_1$).

In block 238, the verifier 206 may generate an evaluated value ($h'_1$) based on the cryptographic function (F), the homomorphic public key (pk'), the initial encrypted key ($sk_1$), and the initial hashed value ($h_1$) of the first message ($m_1$). The evaluated value ($h'_1$) may be generated using an evaluation function (FHE·Eval) of a fully homomorphic encryption scheme (FHE). The evaluation function (FHE·Eval) may evaluate the cryptographic function (F) with inputs of the initial encrypted key ($A_1$), and the initial hashed value ($h_1$) of the first message ($m_1$). An output of the evaluation function (FHE·Eval) includes the evaluated value ($h'_1$). This may apply to a second message ($m_j$). For example, the verifier 206 may generate an evaluated value ($h'_j$) based on the cryptographic function (F), the homomorphic public key (pk'), a subsequent encrypted key ($sk_j$), and a subsequent hashed value ($h_j$) of a second message ($m_j$). This can be expressed as: $h_j' \leftarrow FHE\cdot Eval(pk',\mathcal{F},I)$, where I is an input, $I=(A_j,h_j)$.

In block 240, the verifier 206 may delete the initial and multiple subsequent encrypted keys ($\vec{A}=\{A_j\}_{j=1}^{L}$).

In data flow 242, the verifier 206 may transmit a verification result based on a hashed value ($H(\sigma_j)$) of a signature ($\sigma_j$) and the evaluated value ($h_j'$). For example, the verification result indicates that the first message ($m_1$) is not verified when the hashed value of the initial signature is not equal to the evaluated value ($H(\sigma_1) \neq h_1'$). Similarly, the verification result indicates that a second message ($m_j$) is not verified when the hashed value of a subsequent signature ($\sigma_j$) is not equal to the evaluated value ($H(\sigma_j) \neq h_j'$). If the hashed value of the initial or the subsequent signature is equal to the evaluated value ($H(\sigma_j) = h_j'$), the first or second message is verified.

Figure 3:
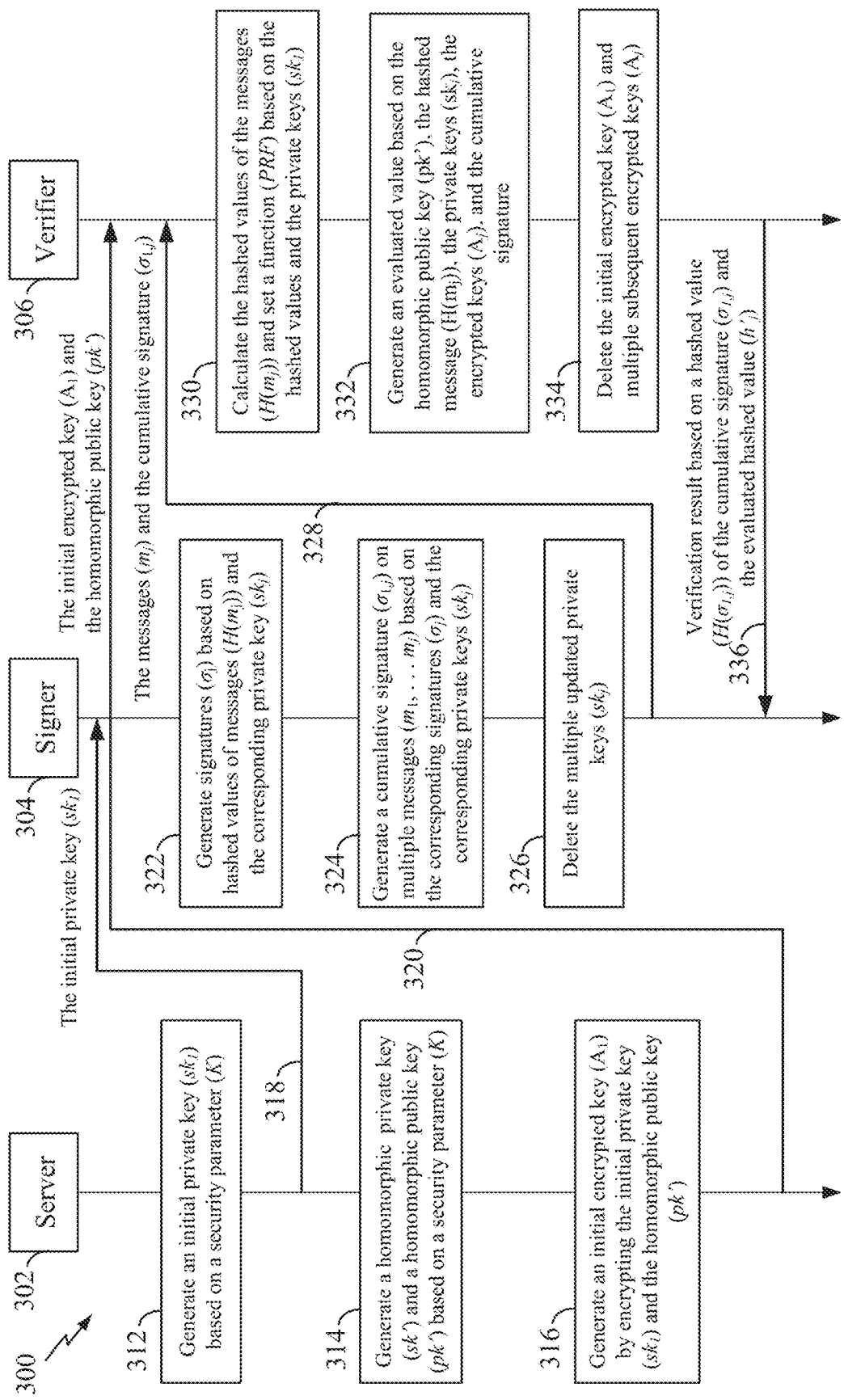
FIG. 3 is a flow chart illustrating an exemplary process for publicly verifiable symmetric cryptography using publicly verifiable forward secure aggregation message authentication code (PUFAMAC) according to some aspects of the disclosure.

FIG. 3 is a flow chart illustrating an exemplary process for publicly verifiable symmetric cryptography using publicly verifiable forward secure aggregation message authentication code (PUFAMAC) in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 300. In FIG. 3, three entities (a generator 302, a signer 304, and a verifier 306) can exist to interact each other. However, it should be appreciated that the three entities are logically separated and are not necessarily and physically separated. For example, the generator 302 may be part of the signer 304 or the verifier 306.

Blocks 312 to 316 illustrate a key generation process at the generator 302. Blocks 312 to 316 are similar to blocks 212 to 216.

Blocks 322 to 326 illustrate a process at the signer 204 to generate signatures ($\sigma_j$) for corresponding messages and a cumulative signature ($\sigma_{1,L}$) for messages ($m_1, \ldots, m_j$).

In block 322, the signer 304 may generate multiple signatures ($\sigma_j$) as discussed in FIG. 2.

In block 324, the signer 304 may generate a cumulative signature ($\sigma_{1,L}$) based on the initial and multiple subsequent signatures ($\vec{\sigma}=\{\sigma_j\}_{j=1}^{L}$), the initial and multiple subsequent private keys ($\vec{sk}=\{sk_j\}_{j=1}^{L}$). For example, the cumulative signature ($\sigma_{1,L}$) may be generated by using an equation: $\sigma_{1,j}=MAC(\sigma_{1,j-1}\|\sigma_j, sk_j)$, where $\sigma_j$ is an initial or subsequent signature, and $sk_j$ is an initial or updated private key. For this step, the signer 304 may generate the initial and multiple subsequent signatures ($\vec{\sigma}=\{\sigma_j\}_{j=1}^{L}$) as described in blocks 222 and 226 in FIG. 2. The signer 304 may further generate the multiple updated private keys ($\vec{sk}=\{sk_j\}_{j=2}^{L}$) using the UDT function as described in block 224 in FIG. 2. In some examples, the signer 304 cumulate signatures as the signer 304 computes them, not altogether. However, one may choose to cumulate them at the end as well, to allow a selective verification (if the signer 304 cumulates them, the signer 304 cannot verify them separately, this is a trade-off). Alternatively, the signer 304 can cumulate them as the signer 304 computes.

In block 326, the signer 304 may delete the initial private and multiple updated private keys ($\vec{sk}=\{sk_j\}_{j=1}^{L}$). In some examples, the initial private key ($sk_1$) is deleted immediately after the initial private key is updated to a next private key ($sk_2$). Also, a private key ($sk_j$) is immediately deleted right after a corresponding signature ($\sigma_j$) is generated at block 324 (i.e., $\sigma_j \leftarrow MAC(H(m_j), sk_j)$) and the private key ($sk_j$) is updated to a subsequent private key ($sk_{j+1}$) at block 224 (i.e., $sk_{j+1} \leftarrow UPD(sk_j)$). Then, this process is repeated until the last signature ($\sigma_L$) corresponding the last message ($m_L$) is generated. As discussed in FIG. 2, the signer 304 may also use the per time period basis approach. In other examples, the signer 204 may exploit a per time period basis approach.

In some examples, the signer 304 can calculate a intermediate cumulative signature ($\sigma_{1,j}$) and update a private key ($sk_j$) to a updated private key ($sk_{j+1}$). Then, the signer 304 can delete the private key ($sk_j$) and keep the intermediate cumulative signature ($\sigma_{1,j}$) and and the updated private key ($sk_{j+1}$). Then, the signer 304 can repeat this process until the signer can obtain the last cumulative signature ($\sigma_{1,j}$). For example, $\sigma_1=MAC(m_1, sk_1)$, $sk_2=UPD(sk_1)$, delete $sk_1$, but keep $\sigma_1$ and $sk_2$. Then, $\sigma_{1,2}=MAC(\sigma_1\|\sigma_2, sk_2)$, where $\sigma_2=MAC(m_2, sk_2)$, delete $sk_2$, but keep $\sigma_{1,2}$ and $sk_3$. $\sigma_{1,3}=MAC(\sigma_{1,2}\|\sigma_3, sk_3)$, where $\sigma_3=MAC(m3, sk3)$ and delete $sk_3$. This process is repeated. Thus, signatures are accumulated gradually based on previous computed values. The verifier 306 can use the same but under encryption.

In data flow 328, the signer 304 may transmit the first and second messages ($m_1, \ldots, m_j$) and the cumulative signature ($\sigma_{1,L}$). The verifier 306 may obtain the first and second messages ($m_1, \ldots, m_j$) and the cumulative signature ($\sigma_{1,L}$).

Blocks 330 to 334 illustrates a verification process at the verifier 306. Although the aggregation at the logger side remains near-optima, PUFAMAC may exploit a different verification strategy from that of PUFMAC of FIG. 2. For example, while PUFMAC of FIG. 2 verifies MACs under encryption independently, PUFAMAC of FIG. 3 verifies the cumulative signature ($\sigma_{1,L}$) depending on all previously computed MACs.

In block 330, the verifier 306 may calculate the hashed values ($h_1, \ldots h_j$) of the first and multiple second messages ($m_1, \ldots, m_j$) and set a function (PRF) based on the hashed values ($h_j$) and the private keys ($sk_j$). The function may be expressed as: $F:PRF(\sigma_{1,j-1}\|PRF(h_j, sk_j), sk_j)$.

In block 332, the verifier 306 may generate an evaluated value ($cs_j$) based on the homomorphic public key (pk'), the hashed value of the first or second message ($m_j$), the initial or subsequent encrypted key ($A_j$), and the cumulative signature ($\sigma_{1,L}$). This can be expressed as: $cs_j \leftarrow FHE \cdot Eval(pk', PRF(\sigma_{1,j-1}\|PRF(h_j, sk_j), sk_j), I)$, where $I=(cs_{j-1}, A_j, h_j)$, and $cs_j$ is the evaluated value. For this step, the verifier 306 may generate subsequent encrypted keys ($A_2, \ldots A_j$) as described in block 236 in FIG. 2.

In block 223, after generating the evaluated value ($cs_j$), the verifier 306 may delete the initial encrypted key ($A_1$) and multiple subsequent encrypted keys ($A_2, \ldots A_j$).

In data flow 336, the verifier 306 may transmit a verification result. The verification result may be based on a hashed value ($H(\sigma_{1,L})$) of the cumulative signature ($\sigma_{1,L}$) and the evaluated value ($FHE \cdot Eval(pk', H, cs_{1,L})$) on messages ($\vec{m}=\{m_j\}_{j=1}^{L}$). If the hashed value is equal to the evaluated value, the messages are verified. If not, the messages are not verified.

Figure 4:
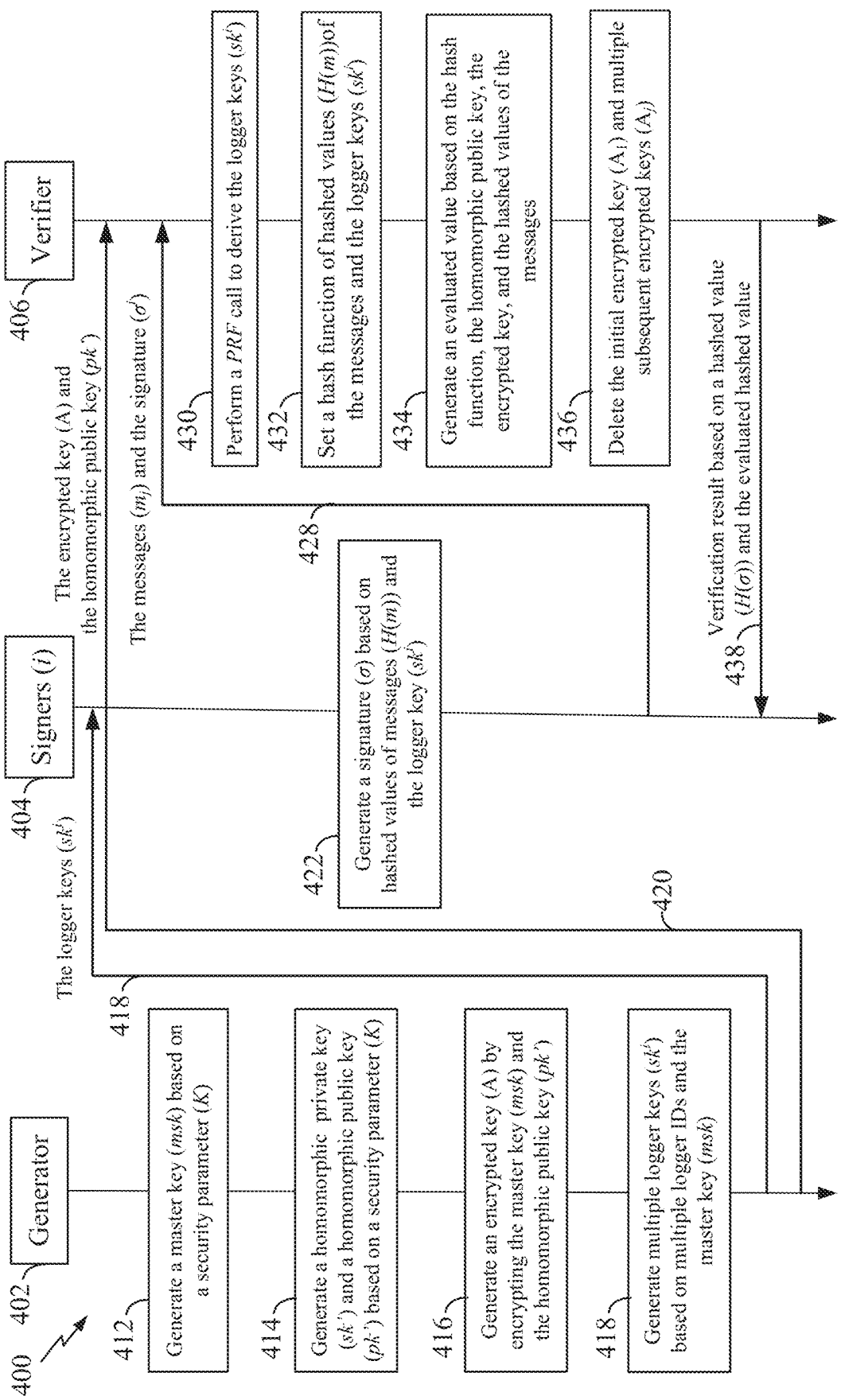
FIG. 4 is a flow chart illustrating an exemplary process for publicly verifiable symmetric cryptography using multi-logger publicly verifiable message authentication code (MUPUMAC) according to some aspects of the disclosure.

FIG. 4 is a flow chart illustrating an exemplary process for publicly verifiable symmetric cryptography using multi-logger publicly verifiable message authentication code (MUPUMAC) in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 400. In FIG. 4, three entities (a generator 402, a signer 404, and a verifier 406) can exist to interact each other. However, it should be appreciated that the three entities are logically separated and are not necessarily and physically separated. For example, the generator 402 may be part of the signer 404 or the verifier 406.

Blocks 412 to 418 illustrate a key generation process at the generator 302.

In Block 412, the generator 402 may generate a master key (msk) based on a security parameter (K).

In block 414, the generator 402 may generate a homomorphic private key (sk') and a homomorphic public key (pk') based on the security parameter (K).

In block 416, the generator 402 may generate an encrypted key (A) based on the homomorphic public key (pk') and the master key (msk). Here, the master key (msk) can be sealed as the encrypted key (A) by using an equation: $A \leftarrow FHE \cdot Enc(pk', msk)$.

In block 418, the generator 402 may generate multiple logger keys ($sk^i$) for multiple signers (i) based on multiple corresponding logger identifications ($ID_i$) and the master key (msk). This can be expressed as: $sk^i \leftarrow PRF(ID_i, msk)$. In some examples, the PRF input may be hashed to speed-up the evaluation.

In data flow 418, the generator 402 may transmit the multiple logger keys ($sk^i$) to multiple corresponding signers (i). Each signer 404 may obtain a corresponding logger key ($sk^i$).

In data flow 420, the generator 402 may transmit the encrypted key (A) and the homomorphic public key (pk'). In some examples, the generator generates a system-wide public key (PK) to include the encrypted key (A) and the homomorphic public key (pk'). This can be expressed as: PK←(A,pk').

Block 422 illustrates a signature generation process for a message. In block 422, the signer 404 may generate a signature ($\sigma^i$) of the signer (i) based on the logger key (sk') and a hashed value (h(m)) of a message (m). For example, the signature ($\sigma^i$) of the signer (i) can be obtained by using an equation: $\sigma^i \leftarrow MAC(h, sk^i)$.

In data flow 424, each signer (i) 404 may transmit its message ($m^i$) and the signature ($\sigma^i$) to the verifier 406. The verifier 406 may obtain multiple messages ($m^1, \ldots, m^i$) and signatures ($\sigma^1, \ldots, \sigma^i$) from corresponding multiple signers (i).

Blocks 426 to 430 illustrate a verification process using MUPUFMAC.

In block 426, the verifier 406 may perform a PRF call to drive the logger keys ($sk_1, \ldots, sk^i$). For example, the verifier 406 may calculate the hashed value (h) of the message ($m^i$) corresponding to the signer.

In block 428, the verifier 406 may set a has function (F) of the hashed value (h) of the message (m) and the logger key ($sk^i$) corresponding to the signer (i). This can be expressed as: $\mathcal{F}:H(PRF(h,PRF(ID_i,msk)))$, where $PRF(ID_i, msk)$ is the logger key ($sk^i$), and h is the hashed value of the message (m) (e.g., h←H(m)).

In block 430, the verifier 408 may generate an evaluated value based on the hash function (F), the homomorphic public key (pk'), the encrypted key (A), and the hashed value of the message (m) for each signer (i). For example, the evaluated value can be generated by using an equation: FHE·Eval(pk', $\mathcal{F}$, I), where F is the hash function, and I=(A, h).

In data flow 432, the verifier 406 may transmit a verification result based on the evaluated value and a hashed value (H($\sigma$)) of the signature (a) corresponding to the signer. If H($\sigma$)=FHE·Eval(pk', $\mathcal{F}$, I), the signature is verified. Otherwise, the signature is not verified.

Figure 5:
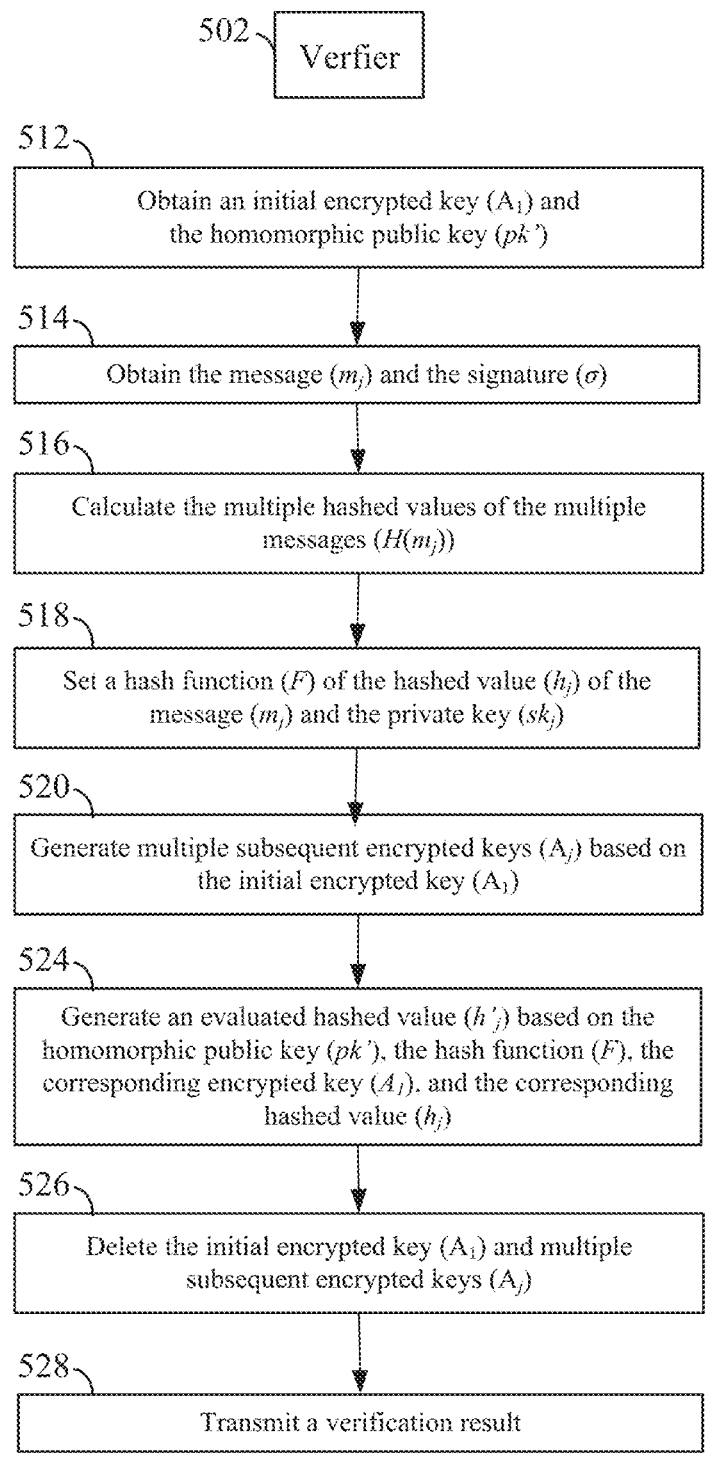
FIG. 5 is a flow chart illustrating an exemplary process for publicly verifiable symmetric cryptography at a verifier according to some aspects of the disclosure.

FIG. 5 is a flow chart illustrating an exemplary process for publicly verifiable symmetric cryptography at a verifier in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 500.

In block 512, the verifier 502 may obtain an initial encrypted key and a homomorphic public key as described in data flow 220 in FIG. 2.

In block 514, the verifier 502 may obtain the message and the signature as described in data flow 230 in FIG. 2.

Blocks 516, 518, 520, 524, and 526 may correspond to blocks 232, 234, 236, 238, and 240.

In block 528, the verifier 502 may transmit a verification result as described in data flow 242 in FIG. 2.

Figure 6:
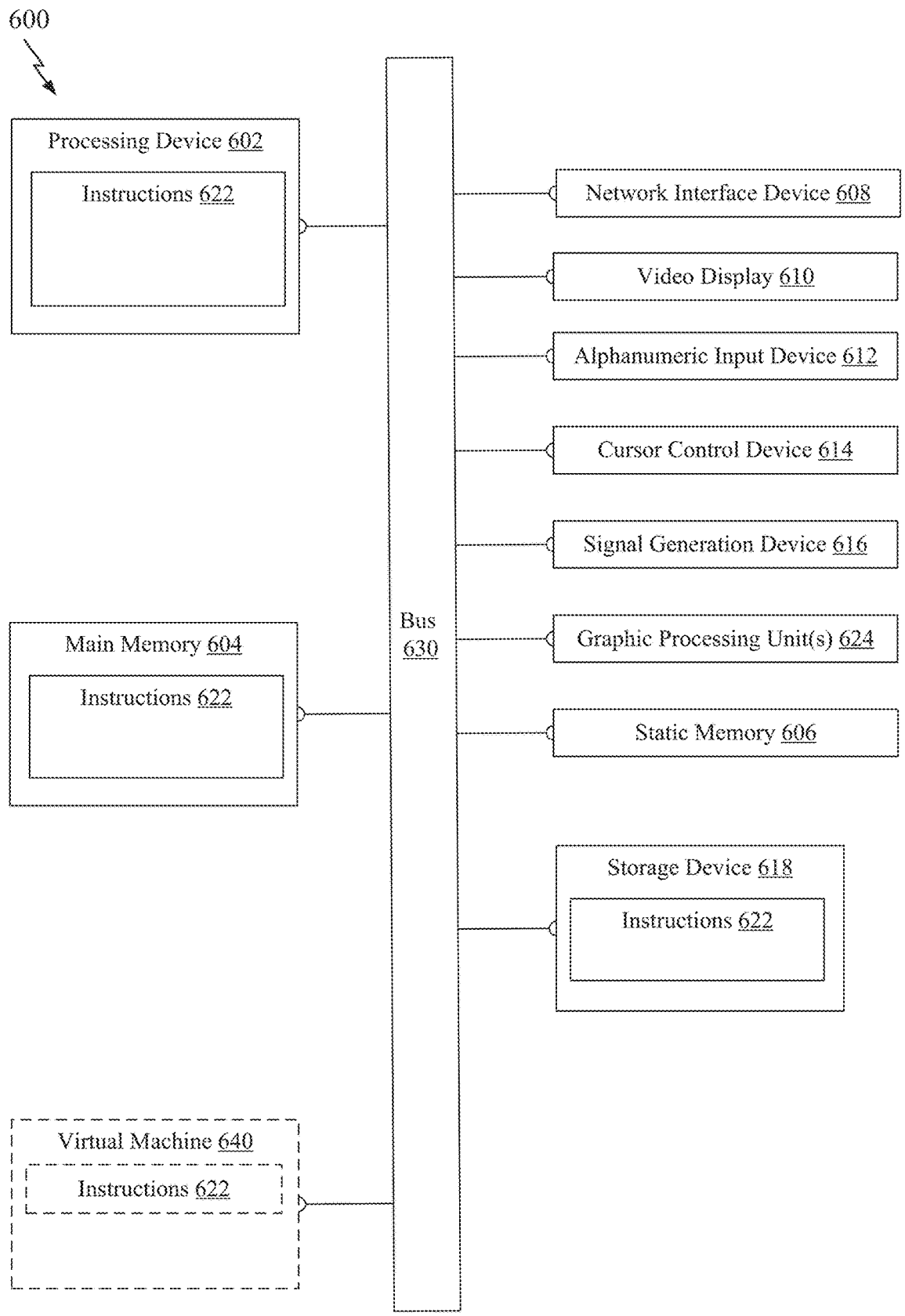
FIG. 6 is a block diagram conceptually illustrating an example of a hardware implementation for the methods disclosed herein.

FIG. 6 is a block diagram conceptually illustrating an example apparatus of a computer system 600 within which a set of instructions, for causing the apparatus to perform any one or more of the methods disclosed herein, may be executed. In alternative implementations, the apparatus may be connected (such as networked) to other apparatus in a LAN, an intranet, an extranet, and/or the Internet. The computer system 600 may be a generator 202 in FIG. 2, 302 in FIG. 3, and/or 402 in FIG. 4; a signer 204 in FIG. 2, 304 in FIG. 3, and/or 404 in FIG. 4; and a verifier 206 in FIG. 2, 306 in FIG. 3, and/or 406 in FIG. 4. In some examples, the signer 204 in FIG. 2, 304 in FIG. 3, and/or 404 in FIG. 4 may have limited computing power and resources. In further examples, the generator and the verifier may be in the same computer system 600 or in separate computer systems 600.

The apparatus may operate in the capacity of a server or a client machine in a client-server network environment, as a peer machine in a peer-to-peer (or distributed) network environment, or as a server or a client machine in a cloud computing infrastructure or environment. The apparatus may be a server computer, a personal computer, a tablet, a cellular telephone, an IoT device, a web appliance, a server, a network router, a switch or bridge, or any apparatus capable of executing a set of instructions (sequential or otherwise) that specify actions to be taken by that apparatus. Further, while a single apparatus is illustrated, the term "apparatus" shall also be taken to include any collection of apparatuses that individually or jointly execute a set (or multiple sets) of instructions to perform any one or more of the methods discussed herein.

The example computer system 600 includes a processor 602, a main memory 604 (such as read-only memory (ROM), flash memory, dynamic random access memory (DRAM) such as synchronous DRAM (SDRAM) or DRAM, etc.), a static memory 606 (such as flash memory, static random access memory (SRAM), etc.), and a data storage device 618, which communicate with each other via a bus 630.

Processor 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608 for connecting to the LAN, intranet, internet, and/or the extranet. The computer system 600 also may include a video display unit 610 (such as a liquid crystal display (LCD) or a cathode ray tube (CRT)), an alphanumeric input device 612 (such as a keyboard), a cursor control device 614 (such as a mouse), a signal generation device 616 (such as a speaker), and a graphic processing unit 624 (such as a graphics card).

The data storage device 618 may be a machine-readable storage medium 1028 (also known as a computer-readable medium) on which is stored one or more sets of instructions or software 622 embodying any one or more of the methods or functions described herein. The instructions 622 may also reside, completely or at least partially, within the main memory 604 and/or within the processor 602 during execution thereof by the computer system 600, the main memory 604 and the processor 602 also constituting machine-readable storage media.

In one implementation in the generator, the instructions 622 include generating instructions for generating an initial private key based on a security parameter, generating a homomorphic private key and a homomorphic public key based on the security parameter, generating an initial encrypted key, and/or generating multiple logger keys based on multiple logger IDs and the master key at blocks 212, 214, and/or 216 of FIG. 2; blocks 312, 314, and/or 316 of FIG. 3; and/or blocks 412, 414, 416, and/or 418 of FIG. 4. The instructions 622 in the generator may further include transceiving instructions for obtaining a security parameter, transmitting the initial private key, the initial encrypted key, and/or the homomorphic public key at data flows 218 and/or 220.

In further implementation in the signer, the instructions 622 include generating instructions for generating an initial signature, generating multiple updated private key while deleting previous private keys, generating multiple subsequent signatures, generating a cumulative signature, and/or an intermediate cumulative signature at blocks 222, 224, 226, and/or 228 in FIG. 2, blocks 322, 324, and/or 326 in FIG. 3, and/or block 422 in FIG. 4. The instructions 622 in the signer may further include transceiving instructions for obtaining the initial private key, transmitting the message and the its corresponding signature, transmitting the message and the cumulative signature, obtaining logger keys, and/or transmitting the message and the corresponding signature at data flows 220 and/or 230 in FIGS. 2, 320 and/or 328 in FIG. 3, and/or 418 and/or 424 in FIG. 4.

In further implementation in the verifier, the instructions 622 include calculating instructions for calculating the multiple hashed values of the multiple messages, setting a hash function of the hashed value, and/or performing a PRF call to derive the logger keys at blocks 232 and/or 234 in FIG. 2, 330 in FIGS. 3, 426, and/or 428 in FIGS. 4, 516 and/or 518 in FIG. 5. The instructions 622 in the verifier may further include generating instructions for generating multiple subsequent encrypted keys with deletion of the previous encrypted keys, and/or generating an evaluated hashed value at blocks 236, 238, and/or 240 in FIGS. 2, 332 and/or 334 in FIG. 3, 430 in FIG. 4, and/or 520, 524, and/or 526 in FIG. 5. The instructions 622 in the verifier may further include transceiving instructions for obtaining the initial encrypted key, the homomorphic public key, the message, the signature, and/or the cumulative signature, and/or transmitting a verification result at data flows 220, 230, and/or 242 in FIGS. 2, 320, 328, and/or 336 in FIGS. 3, 420, 424, and/or 432 in FIG. 4, and/or 512 and/or 528 in FIG. 5.

While the machine-readable storage medium 618 is shown in an example implementation to be a single medium, the term "machine-readable storage medium" should be taken to include a single medium or multiple media (such as a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media. The term "machine-readable storage medium" shall accordingly exclude transitory storage mediums such as signals unless otherwise specified by identifying the machine-readable storage medium as a transitory storage medium or transitory machine-readable storage medium.

In another implementation, a virtual machine 640 may include a module for executing instructions similarly described above in connection with instructions 622. In computing, a virtual machine (VM) is an emulation of a computer system. Virtual machines are based on computer architectures and provide functionality of a physical computer. Their implementations may involve specialized hardware, software, or a combination of hardware and software.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. The detailed description set forth above, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

What is claimed is:

1. A method for publicly verifiable symmetric cryptography, the method comprising:
   generating, at a processor of a generator, an initial private key based on a security parameter;
   generating, at the processor of the generator, a homomorphic private key and a homomorphic public key based on the security parameter;
   generating, at the processor of the generator, an initial encrypted key based on the homomorphic public key and the initial private key;
   obtaining, from a processor of a signer, the initial private key;
   obtaining, at a processor of a verifier, the initial encrypted key and the homomorphic public key;
   obtaining, at the processor of the verifier from the signer, a first message and an initial signature, wherein the initial signature is based on an initial hashed value of the first message and the initial private key;
   calculating, at the processor of the verifier, the initial hashed value of the first message;
   setting, at the processor of the verifier, a cryptographic function of the initial hashed value of the first message and the initial private key;
   generating, at the processor of the verifier, an evaluated value based on the cryptographic function, the homomorphic public key, the initial encrypted key, and the initial hashed value of the first message; and
   transmitting, at the processor of the verifier, a verification result based on a hashed value of the initial signature and the evaluated value.

2. The method of claim 1, wherein the homomorphic private key and the homomorphic public key are generated using a fully homomorphic encryption scheme.

3. The method of claim 1, wherein the initial encrypted key is generated by encrypting the initial private key based on the homomorphic public key using a fully homomorphic encryption scheme.

4. The method of claim 1, wherein the initial signature is generated using a message authentication code scheme,
   wherein the initial signature is an output of the message authentication code scheme, and
   wherein the initial hashed value of the first message and the initial private key are inputs of the message authentication code scheme.

5. The method of claim 4, wherein the initial hashed value of the first message is obtained using a cryptographic hash function with an input of the first message.

6. The method of claim 4, wherein the message authentication code scheme is designed based on a pseudorandom function.

7. The method of claim 1, further comprising:
   obtaining, at the processor of the verifier from the signer, a plurality of second messages and a plurality of subsequent signatures, wherein a plurality of subsequent signatures is based on a plurality of subsequent hashed values of a plurality of second messages and a plurality of updated private keys.

8. The method of claim 7, wherein a first updated private key of the plurality of updated private keys is generated based on the initial private key, and
   wherein a second updated private keys of the plurality of updated private keys is generated based on the first updated private key.

9. The method of claim 7, wherein after the plurality of subsequent signatures is generated, the initial private key and the plurality of updated private keys are deleted.

10. The method of claim 7, further comprising:
    calculating, at the processor of the verifier, the plurality of subsequent hashed values of the plurality of second messages; and
    applying, at the processor of the verifier, the plurality of subsequent hashed values of the plurality of second messages and the plurality of updated private keys to the cryptographic function.

11. The method of claim 7, wherein the plurality of updated private keys are generated using a one-way key update function.

12. The method of claim 1, wherein the cryptographic function includes a hashing function of a pseudorandom function with the initial hashed value of the first message and the initial private key.

13. The method of claim 1, wherein the evaluated value is generated using an evaluation function of a fully homomorphic encryption scheme,
    wherein the evaluation function evaluates the cryptographic function with inputs of the initial encrypted key, and the initial hashed value of the first message, and
    wherein an output of the evaluation function includes the evaluated value.

14. The method of claim 1, wherein the verification result indicates that the first message is verified when the hashed value of the initial signature is equal to the evaluated value.

15. The method of claim 1, further comprising:
    calculating, at the processor of the verifier, a plurality of subsequent hashed values of a plurality of second messages, wherein a plurality of subsequent signatures is obtained based on a plurality of subsequent hashed values of a plurality of second messages and a plurality of updated private keys,
    wherein the cryptographic function is further based on the plurality of subsequent hashed values of the plurality of second messages and the plurality of updated private keys,
    wherein the evaluated value is generated further based on the plurality of subsequent hashed values of the plurality of second messages, wherein the verification result is based on a hashed value of a cumulative signature and the evaluated value, wherein the cumulative signature is obtained based on the initial signature, the plurality of subsequent signatures, the initial private key, and the plurality of updated private keys.

16. A method for publicly verifiable symmetric cryptography, the method comprising:

generating, at a processor of a generator, a master key based on a security parameter;

generating, at the processor of the generator, a homomorphic private key and a homomorphic public key based on the security parameter;

generating, at the processor of the generator, an encrypted key based on the homomorphic public key and the master key;

generating, at the processor of the generator, a plurality of logger keys for a plurality of signers based on a plurality of corresponding logger identifications and the master key;

obtaining, from a processor of a first signer of the plurality of signers, a logger key of the plurality of logger keys corresponding to the first signer;

obtaining, at a processor of a verifier, the encrypted key and the homomorphic public key;

obtaining, at the processor of the verifier from the first signer, a message and a signature corresponding to the first signer, the signature being based on the logger key and a hashed value of the message;

calculating, at the processor of the verifier, the logger key based on the master key and a logger identification corresponding to the logger key;

calculating, at the processor of the verifier, the hashed value of the message corresponding to the first signer;

setting, at the processor of the verifier, a hash function of the hashed value and the logger key;

generating, at the processor of the verifier, an evaluated value based on the hash function, the homomorphic public key, the encrypted key, and the hashed value of the message; and transmitting, at the processor of the verifier, a verification result based on the evaluated value and a hashed value of the signature corresponding to the first signer.

17. The method of claim 16, wherein the encrypted key is generated by encrypting the master key based on the homomorphic public key.

18. A method for publicly verifiable symmetric cryptography operable at a processor of a verifier, the method comprising:

obtaining an initial encrypted key and a homomorphic public key;

obtaining a first message and an initial signature;

calculating an initial hashed value of the first message;

setting a cryptographic function of the initial hashed value of the first message and an initial private key;

generating an evaluated value based on the cryptographic function, the homomorphic public key, the initial encrypted key, and the initial hashed value of the first message; and transmitting a verification result based on a hashed value of the initial signature and the evaluated value.

19. The method of claim 18, further comprising:

obtaining a plurality of second messages;

calculating a plurality of subsequent hashed values of the plurality of second messages; and applying the plurality of subsequent hashed values of the plurality of second messages and a plurality of updated private keys to the cryptographic function.

20. The method of claim 18, wherein the cryptographic function includes a hashing function of a pseudorandom function with the initial hashed value of the first message and the initial private key.

21. The method of claim 18, wherein the evaluated value is generated using an evaluation function of a fully homomorphic encryption scheme, wherein the evaluation function evaluates the cryptographic function with inputs of the initial encrypted key, and the initial hashed value of the first message, and wherein an output of the evaluation function includes the evaluated value.

22. The method of claim 18, wherein the verification result indicates that the first message is verified when the hashed value of the initial signature is equal to the evaluated value.

* * * * *